(12) United States Patent
Takahashi (10) Patent No.: US 10,377,187 B2
(45) Date of Patent: Aug. 13, 2019

(54) PNEUMATIC TIRE

(71) Applicant: TOYO TIRE & RUBBER CO., LTD., Osaka-shi, Osaka (JP)

(72) Inventor: Toshihiko Takahashi, Osaka (JP)

(73) Assignee: Toyo Tire Corporation, Itami-shi (JP)

( * ) Notice: Subject to any disclaimer, the term of this patent is extended or adjusted under 35 U.S.C. 154(b) by 318 days.

(21) Appl. No.: 14/580,477

(22) Filed: Dec. 23, 2014

(65) Prior Publication Data

US 2015/0321523 A1    Nov. 12, 2015

(30) Foreign Application Priority Data

May 8, 2014    (JP) .................................. 2014-096688

(51) Int. Cl.
*B60C 13/02* (2006.01)
*B60C 13/00* (2006.01)

(52) U.S. Cl.
CPC ............ *B60C 13/002* (2013.01); *B60C 13/02* (2013.01)

(58) Field of Classification Search
CPC ....... B60C 13/02; B60C 13/002; B60C 13/00; B60C 13/001; B60C 13/023; B60C 2013/026
USPC ...................................................... 152/523
See application file for complete search history.

(56) References Cited

U.S. PATENT DOCUMENTS

| | | | | |
|---|---|---|---|---|
| 4,155,393 A | * | 5/1979 | Grawey | B60C 13/02 152/153 |
| 4,461,795 A | * | 7/1984 | Ogawa | B60C 13/001 428/66.5 |
| 5,380,391 A | * | 1/1995 | Mahn, Jr. | B32B 25/00 152/523 |
| 6,494,543 B1 | * | 12/2002 | Hashimura | B60B 21/102 152/510 |
| 9,446,630 B2 | * | 9/2016 | Kouda | B60C 13/02 |
| 2001/0002604 A1 | * | 6/2001 | Ikeda | B60C 13/001 152/523 |
| 2003/0111150 A1 | * | 6/2003 | Zimmer | B60C 11/00 152/209.19 |

(Continued)

FOREIGN PATENT DOCUMENTS

| | | | |
|---|---|---|---|
| DE | 102010017634 A1 | * 12/2011 | ............. B60C 13/02 |
| EP | 2502758 A1 | 9/2012 | |

(Continued)

OTHER PUBLICATIONS

Office Action dated Sep. 8, 2016, issued in counterpart Chinese Patent Application No. 201510040965.8, with English translation. (12 pages).
Office Action dated Apr. 17, 2017, issued in counterpart Chinese Application No. 2015100409658, with English translation (15 pages).
Office Action dated Nov. 14, 2017, issued in counterpart Chinese Application No. 201510040965.8, with English translation. (20 pages).
Office Action dated Mar. 22, 2018, issued in counterpart German Application No. 102015102614.7, with English translation. (7 pages).
Office Action dated Aug. 29, 2017, issued in counterpart Japanese Application No. 2014-096688, with English translation. (5 pages).

(Continued)

*Primary Examiner* — Seyed Masoud Malekzadeh
(74) *Attorney, Agent, or Firm* — Westerman, Hattori, Daniels & Adrian, LLP (57) ABSTRACT

A pneumatic tire includes a plurality of linear projections which are formed linearly from an edge portion over the edge portion, in at least a partial area on an outer surface of a side wall portion and a plurality of protruding portions which are formed linearly in the area. The protruding portion is arranged so that at least a part of the protruding portion is positioned between the linear projections, and the protruding (Continued)

portion intersects with the linear projection and the other protruding portion at one position or less.

16 Claims, 12 Drawing Sheets

(56) References Cited

U.S. PATENT DOCUMENTS

| | | | | |
|---|---|---|---|---|
| 2006/0164727 | A1* | 7/2006 | Feemster | B60C 11/00 |
| | | | | 359/524 |
| 2012/0055603 | A1* | 3/2012 | Tokizaki | B60C 13/001 |
| | | | | 152/523 |
| 2012/0152427 | A1* | 6/2012 | Yamakawa | B60C 13/02 |
| | | | | 152/523 |
| 2012/0273101 | A1* | 11/2012 | Iwabuchi | B60C 13/001 |
| | | | | 152/151 |
| 2013/0075006 | A1* | 3/2013 | Kojima | B60C 13/02 |
| | | | | 152/523 |
| 2014/0096883 | A1* | 4/2014 | Miyazaki | B29D 30/0605 |
| | | | | 152/523 |
| 2014/0326385 | A1* | 11/2014 | Sato | B60C 13/02 |
| | | | | 152/523 |

FOREIGN PATENT DOCUMENTS

| | | |
|---|---|---|
| GB | 443862 A | 3/1936 |
| JP | 2004-338655 A | 12/2004 |
| JP | 2011-37387 A | 2/2011 |
| JP | 2013-103631 A | 5/2013 |

* cited by examiner

| | EXAMPLE 1 (Fig. 3) | EXAMPLE 2 (Fig. 7) | EXAMPLE 3 (Fig. 9) | COMPARATIVE EXAMPLE 1 (Fig. 16) | COMPARATIVE EXAMPLE 2 (Fig. 17) | COMPARATIVE EXAMPLE 3 (Fig. 18) |
|---|---|---|---|---|---|---|
| LINEAR PROJECTION 10 | GRID-LIKE PATTERN / INCLINED IN DIAMETRICAL DIRECTION AND PERIPHERAL DIRECTION | GRID-LIKE PATTERN / INCLINED IN DIAMETRICAL DIRECTION AND PERIPHERAL DIRECTION | GRID-LIKE PATTERN / ALONG DIAMETRICAL DIRECTION OR PERIPHERAL DIRECTION | ALONG DIAMETRICAL DIRECTION | GRID-LIKE PATTERN / INCLINED IN DIAMETRICAL DIRECTION AND PERIPHERAL DIRECTION | WITHOUT |
| PROTRUDING PORTION 11 | + SHAPE / INTERSECT WITH TWO LINEAR PROJECTION | + SHAPE / INTERSECT WITH TWO LINEAR PROJECTION | + SHAPE / INTERSECT WITH TWO LINEAR PROJECTION | WITHOUT | WITHOUT | + SHAPE |
| SOIL SUPPRESSION EVALUATION | 108 | 108 | 108 | 100 | 105 | 110 |
| OUTER APPEARANCE EVALUATION | 100 | 100 | 100 | 100 | 95 | 90 |

PNEUMATIC TIRE

CROSS REFERENCE TO RELATED APPLICATIONS

This application claims the benefit of priority under 35 USC 119 of Japanese application no. 2014-096688, filed on May 8, 2014, which is incorporated herein by reference.

BACKGROUND OF THE INVENTION

Field of the Invention

The present invention relates to a pneumatic tire.

Description of the Related Art

Conventionally, as a pneumatic tire, there has been known a pneumatic tire having a plurality of linear projections on at least a partial area on an outer surface of a side wall portion, the linear projections extending linearly from an edge of the area over the edge (for example, JP-A-2011-37387). According to the pneumatic tire, it is possible to make recesses and protrusions generated on the outer surface of the side wall portion at the time of tire molding less noticeable.

In the meantime, when a vehicle travels in the muddy terrain, the dirt scatters toward an outer side of the side wall portion. Further, the dirt entering between the linear projections, for example, dries to be solid mass, and then attached to the side wall portion. As a result, since the outer surface of the side wall portion appears soiled, aesthetic property of the side wall portion is lowered.

SUMMARY OF THE INVENTION

Accordingly, the present invention is made by taking the circumstance mentioned above into consideration, and an object of the present invention is to provide a pneumatic tire which can inhibit an outer surface of a side wall portion from being soiled.

According to the present invention, there is provided a pneumatic tire, which includes:

a plurality of linear projections which are formed linearly from an edge portion over the edge portion, in at least a partial area on an outer surface of a side wall portion; and a plurality of protruding portions which are formed linearly in the area, wherein the protruding portion is arranged so that at least a part of the protruding portion is positioned between the linear projections, and the protruding portion intersects with the linear projection and the other protruding portion at one position or less.

In the pneumatic tire according to the present invention, at least the partial area on the outer surface of the side wall portion is provided with a plurality of linear projections which are formed linearly from the edge portion over the edge portion. Further, the area is provided with a plurality of protruding portions which are formed linearly.

Further, at least a part of the protruding portion is positioned between the linear projections. As a result, when the dirt entering between the linear projections dries to be the soil mass, the protruding portion forms a notch in the soil mass. Therefore, since the side wall portion elastically deforms when the vehicle travels, the soil mass cracks or crashes starting from the notch formed by the protruding portion, for example. As a result, it is possible to inhibit the dirt entering between the linear projections from being attached to the side wall portion.

In the meantime, the dirt tends to stay in a closed space. On the contrary, the protruding portion intersects with the linear projection and the other protruding portion at one position or less. In other words, the protruding portion is separated from the linear projection and the other protruding portion, or the protruding portion intersects with the linear projection and (or) the other protruding portion at one position. Therefore, it is possible to prevent the protruding portion from constructing the closed space with the linear projection and (or) the other protruding portion. As a result, it is possible to further inhibit the dirt from being attached to the side wall portion.

Also, the pneumatic tire may have a configuration in which:

the protruding portion is arranged so as to intersect with the linear projection.

According to the structure mentioned above, since the protruding portion intersects with the linear projection, the protruding portion forms a notch in an edge portion of the soil mass when the dirt entering between the linear projections dries to be the soil mass. Therefore, since the side wall portion elastically deforms when the vehicle travels, the soil mass cracks or crashes starting from the notch in the edge portion formed by the protruding portion, for example.

Further, a vent hole is arranged in an intersecting portion between a protruding portion and a linear projection, for example, in a metal mold for forming the pneumatic tire. Accordingly, it is possible to effectively discharge air staying between the side wall portion and the metal mold. As a result, it is possible to inhibit unnecessary recess (which is generally called also as "bare") from being generated on the outer surface of the side wall portion at the time of the tire molding.

Also, the pneumatic tire may have a configuration in which:

the plurality of linear projections are arranged in a grid-like pattern.

According to the structure mentioned above, since a plurality of linear projections are arranged in a grid-like pattern, the linear projections are arranged over a whole of at least the partial area on the outer surface of the side wall portion. As a result, it is possible to effectively make the recesses and protrusions generated on the outer surface of the side wall portion at the time of the tire molding less noticeable.

Further, the vent hole is arranged in the intersecting portion between the linear projections, for example, in the metal mold for forming the pneumatic tire mentioned above. Accordingly, it is possible to more effectively discharge the air staying between the side wall portion and the metal mold. As a result, it is possible to inhibit the unnecessary recess (the bare) from being generated on the outer surface of the side wall portion at the tire molding time.

Also, the pneumatic tire may have a configuration in which the plurality of protruding portions are disposed inside of the grid pattern.

Also, the pneumatic tire may have a configuration in which:

the protruding portion is arranged so as to intersect with at least one other protruding portion.

According to the structure mentioned above, since the protruding portion intersects with at least one other protruding portion, the protruding portions form a plurality of notches extending in different directions in the soil mass when the dirt entering between the linear projections dries to be the soil mass. Further, since the side wall portion elastically deforms in various directions, the soil mass cracks or crashes starting from an appropriate notch among a plurality of notches extending in the different direction, for example. As a result, it is possible to effectively inhibit the dirt entering between the linear projections from being attached to the side wall portion.

Also, the pneumatic tire may have a configuration in which:

a protruding amount of the protruding portion is the same as a protruding amount of the linear projection, or larger than the protruding amount of the linear projection.

According to the structure mentioned above, since the protruding amount of the protruding portion is the same as the protruding amount of the linear projection, or the protruding amount of the protruding portion is greater than the protruding amount of the linear projection, it is possible to inhibit the protruding portion from being buried by the dirt entering between the linear projections. As a result, the protruding portion can securely form the notch in the soil mass when the dirt entering between the linear projections dries to be the soil mass.

Also, the pneumatic tire may have a configuration in which at least one end of each protruding portion does not come in contact with any linear projection and does not come in contact with any other protruding portion.

As mentioned above, the pneumatic tire according to the present invention achieves an effect that it is possible to inhibit the outer surface of the side wall portion from being soiled

DETAILED DESCRIPTION OF THE PREFERRED EMBODIMENTS

A description will be given of an embodiment in a pneumatic tire with reference to FIGS. 1 to 3. In each of the drawings (same applied to FIGS. 4 to 16), a dimensional ratio of the drawing and an actual dimensional ratio do not necessarily coincide.

Figure 1:
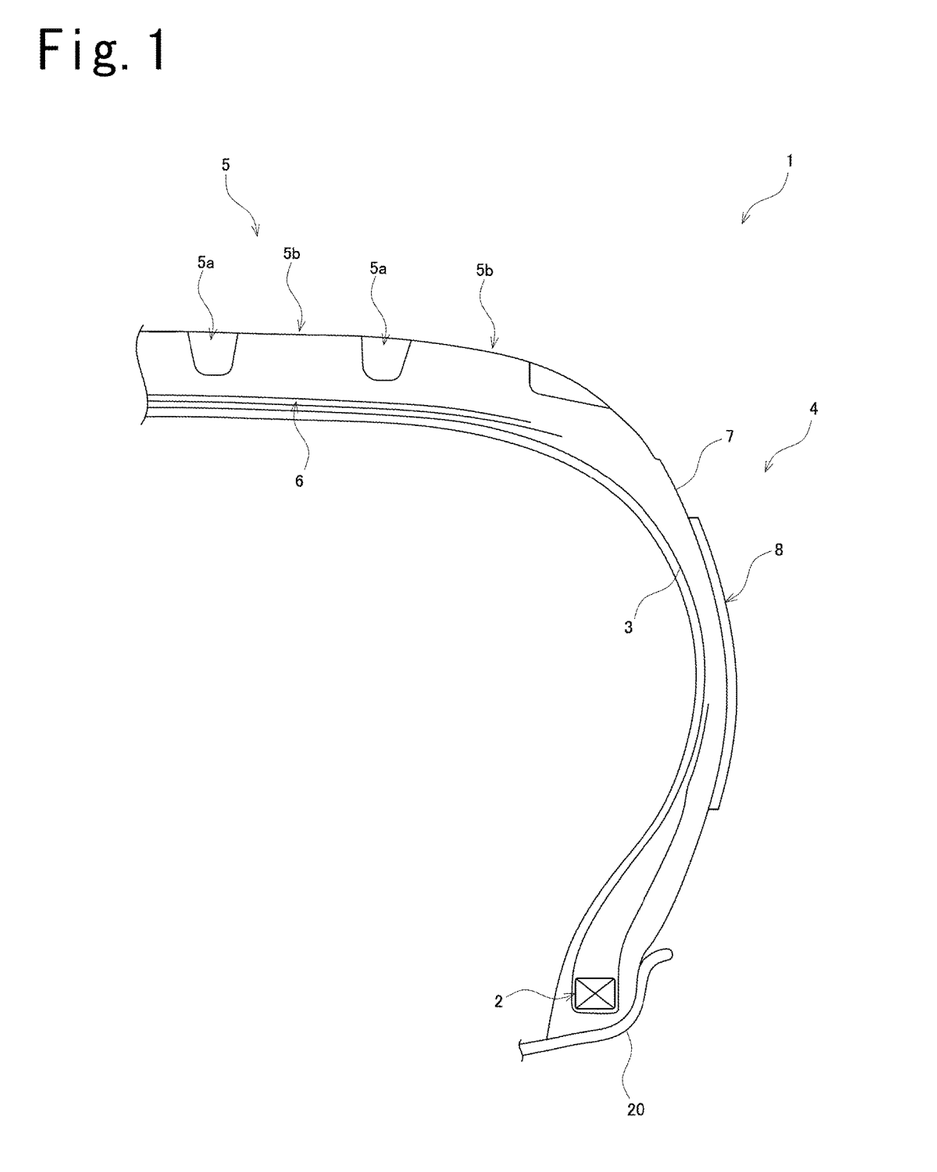
FIG. 1 shows a cross sectional view of a substantial part which is cut along a tire diametrical direction of a pneumatic tire according to an embodiment.

As shown in FIG. 1, a pneumatic tire (hereinafter, refer also simply to as "tire") 1 according to the present embodiment is provided with a pair of annular bead portions 2 and 2, and a carcass layer 3 which wraps around the bead portions 2 and is bridged between a pair or bead portions 2 and 2. Further, the tire 1 is provided with side wall portions 4 and 4 which extend outward in a tire diametrical direction from the respective bead portions 2.

The tire 1 is provided with a tread rubber portion 5 which is connected to an outer end in the tire diametrical direction of each of the side wall portions 4, and a belt layer 6 which is arranged in an outer peripheral side of the carcass layer 3 and in an inner peripheral side of the tread rubber portion 5 for reinforcing the carcass layer 3. Further, the tread rubber portion 5 is provided with a plurality of main grooves 5a, and is also provided with a plurality of land portions 5b which are delimited by a plurality of main grooves 5a. The tire 1 is installed to a rim 20.

The side wall portion 4 is provided with a wall main body 7, and an ornament portion 8 which is arranged in a partial area of an outer surface. The ornament portion 8 is arranged in a part (a center predetermined area) in the tire diametrical direction in the side wall portion 4, as shown in FIG. 2. Further, the ornament portion 8 is arranged over a whole periphery in a tire peripheral direction in the side wall portion 4.

The ornament portion 8 is provided with an edge portion 9 which protrudes linearly from the wall main body 7, and the edge portion 9 delimits areas of the ornament portion 8. In the present embodiment, the edge portion 9 is provided with an inner peripheral edge portion 9a and an outer peripheral edge portion 9b. Further, the ornament portion 8 is provided with a plurality of linear projections 10 which protrude linearly from the wall main body 7, and a plurality of protruding portions 11 which protrude linearly from the wall main body 7, as shown in FIG. 3.

The linear projection 10 is formed linearly from a predetermined portion of the edge portion 9 over the other portion of the edge portion 9. Specifically, the linear projection 10 is formed linearly from the inner peripheral edge portion 9a over the outer peripheral edge portion 9b. Further, one end portion of the linear projection 10 is connected to the inner peripheral edge portion 9a, and the other end portion of the linear projection 10 is connected to the outer peripheral edge portion 9b.

The linear projection 10 is arranged so as to be inclined in relation to the tire peripheral direction and the tire diametrical direction. Further, the linear projection 10 is arranged so as to intersect with the other linear projection 10. Specifically, a plurality of linear projections 10 are arranged in a grid-like pattern. As a result, a plurality of recess portions (closed spaces) 30 are formed, the recess portion being surrounded by four linear projections 10.

The linear projection 10 is formed so that a width becomes smaller toward a leading end (as the linear projection goes away from the wall main body 7). As a result, the dirt entering between the linear projections 10 and 10 (in the recess portion 30) tends to go out to the external portion.

The width of the linear projection 10 is, for example, between 0.2 mm and 1.5 mm. Further, a rectangular side of the grid-like pattern (a separated distance between the linear projections 10 and 10) is, for example, between 3 mm and 15 mm. Further, a protruding amount that the linear projection 10 protrudes out of the wall main body 7 is, for example, between 0.2 mm and 1.5 mm.

The protruding portion 11 is arranged so as to intersect with two linear projections 10 and 10. Further, the protruding portion 11 is arranged so as to intersect with one other protruding portion 11. Further, the protruding portion 11 is arranged so that the protruding portion 11 intersects with two linear projections 10 and 10, and one other protruding portion 11 at one position. In other words, the protruding portion 11 intersects with two linear projections 10 and 10, and one other protruding portion 11 in the same portion, i.e., at only one position. As a result, the protruding portion 11 is prevented from forming the closed space with the linear projection 10 and the other protruding portion 11.

The protruding portion 11 extends from the linear projection 10 toward the recess portion 30. Further, the protruding portion 11 is arranged so as to be partly positioned between the linear projections 10 and 10. Further, the protruding amount that the protruding portion 11 protrudes out of the wall main body 7 is the same as the protruding amount that the linear projection 10 protrudes out of the wall main body 7. The protruding amount that the protruding portion 11 protrudes out of the wall main body 7 is the same as the protruding amount that the edge portion 9 protrudes out of the wall main body 7, or is smaller than the protruding amount.

The protruding portion 11 is formed so that a width becomes smaller toward a leading end (as the protruding portion 11 goes away from the wall main body 7). As a result, the dirt entering between the linear projections 10 and 10 (in the recess portion 30) tends to get out to the external portion.

The width of the protruding portion 11 is, for example, between 0.2 mm and 1.5 mm. Further, a length that the protruding portion 11 extends from the linear projection 10 is between 10% and 45% of the rectangular side of the grid-like pattern (the separated distance between the linear projections 10 and 10), for example, between 0.3 mm and 6.75 mm. Further, the protruding amount that the protruding portion 11 protrudes out of the wall main body 7 is, for example, between 0.2 mm and 1.5 mm.

As a result, on the basis of the tire 1 according to the present embodiment, the ornament portion 8 formed in the partial area on the outer surface of the side wall portion 4 is provided with a plurality of linear projections 10 which are formed linearly from the edge portion 9 (the inner peripheral edge portion 9a) over the edge portion 9 (the outer peripheral edge portion 9b). Further, the ornament portion 8 is provided with a plurality of protruding portions 11 which are formed linearly.

Further, a part of the protruding portion 11 is positioned between the linear projections 10 and 10 (in the recess portion 30). As a result, when the dirt entering between the linear projections 10 and 10 (in the recess portion 30) dries to be the soil mass, the protruding portion 11 forms a notch in the soil mass. Therefore, since the side wall portion 4 elastically deforms when the vehicle travels, the soil mass cracks or crushes starting from the notch formed by the protruding portion 11, for example. As a result, it is possible to inhibit the dirt entering between the linear projections 10 and 10 (in the recess portion 30) from being attached to the side wall portion 4.

In the meantime, the dirt tends to stay in the closed space. On the contrary, the protruding portion 11 intersects with the linear projection 10 and the other protruding portion 11 only at one position. In other words, the protruding portion 11 intersects with the linear projections 10 and 10, and the other protruding portion 11 at one position. According to this, it is possible to prevent the protruding portion 11 from constructing the closed space with the linear projections 10 and 10 and the other protruding portion 11. As a result, it is possible to further inhibit the dirt from being attached to the side wall portion 4.

Further, on the basis of the tire 1 according to the present embodiment, since the protruding portion 11 intersects with the linear projection 10, the protruding portion 11 forms a notch in the edge portion of the soil mass, when the dirt entering between the linear projections 10 and 10 (in the recess portion 30) dries to be the soil mass. Therefore, since the side wall portion 4 elastically deforms when the vehicle travels, the soil mass cracks or crushes starting from the notch in the edge portion formed by the protruding portion 11, for example.

Further, on the basis of the tire 1 according to the present embodiment, since a plurality of linear projections 10 are arranged in the grid-like pattern, the linear projections 10 are arranged over a whole of the ornament portion 8 which is arranged in a partial area on the outer surface of the side wall portion 4. As a result, it is possible to effectively make the recesses and protrusions generated on the outer surface of the side wall portion 4 at the tire molding time less noticeable.

Further, in the tire 1 according to the present embodiment, since the protruding portion 11 intersects with one other protruding portion 11, the protruding portions 11 and 11 form a plurality of notches extending in the different directions in the soil mass, when the dirt entering between the linear projections 10 and 10 (in the recess portion 30) dries to be the soil mass. Further, since the side wall portion 4 elastically deforms in the various directions, the soil mass cracks or crushes starting from an appropriate notch among a plurality of notches extending in the different directions, for example. As a result, it is possible to effectively inhibit the dirt entering between the linear projections 10 and 10 (in the recess portion 30) from being attached to the side wall portion 4.

Further, in the tire 1 according to the present embodiment, since the protruding amount of the protruding portion 11 is the same as the protruding amount of the linear projection 10, it is possible to inhibit the protruding portion 11 from being buried by the dirt entering between the linear projections 10 and 10 (in the recess portion 30). As a result, the protruding portion 11 can securely form the notch in the soil mass when the dirt entering between the linear projections 10 and 10 (in the recess portion 30) dries to be the soil mass.

Further, in the tire 1 according to the present embodiment, the linear projections 10 and 10, the protruding portions 11 and 11, and the linear projection 10 and the protruding portion 11 intersect with each other. As a result, in a metal mold for forming the tire 1 mentioned above, it is possible to effectively discharge the air staying between the side wall portion 4 and the metal mold, for example, by arranging a vent hole in each of the intersecting portions. As a result, it is possible to inhibit an unnecessary recess (a bare) from being generated on the outer surface of the side wall portion 4 at the tire molding time.

The pneumatic tire is not limited to the structure according to the embodiment mentioned above, and is not limited to the operations and the effects mentioned above. It goes without saying that the pneumatic tire can be variously changed within the range which does not deflect from the scope of the present invention. For example, it goes without saying that structures and methods according to the following various modified examples can be optionally selected and be employed in the structures and the methods according to the embodiment mentioned above.

Figure 4:
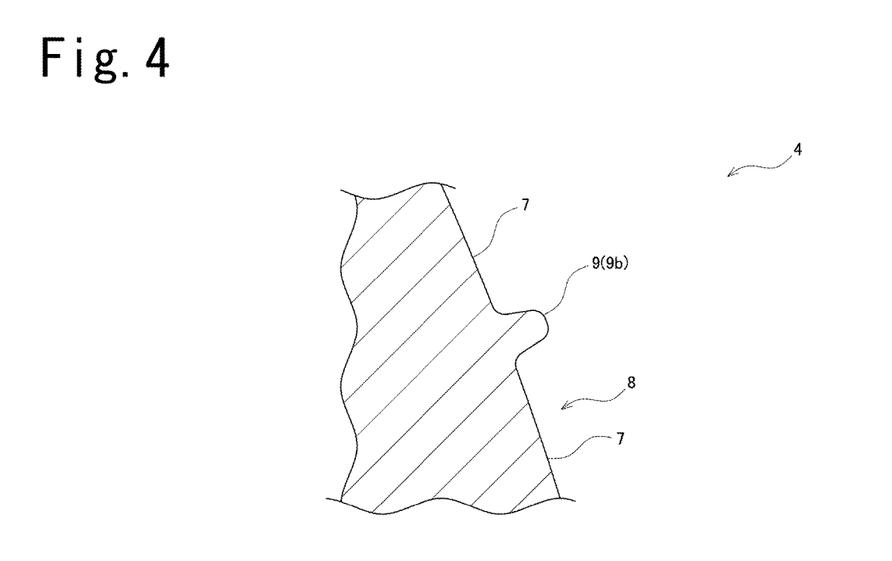
FIG. 4 shows an enlarged cross sectional view of a substantial part which is cut along the diametrical direction of the pneumatic tire according to the embodiment.
Figure 5:
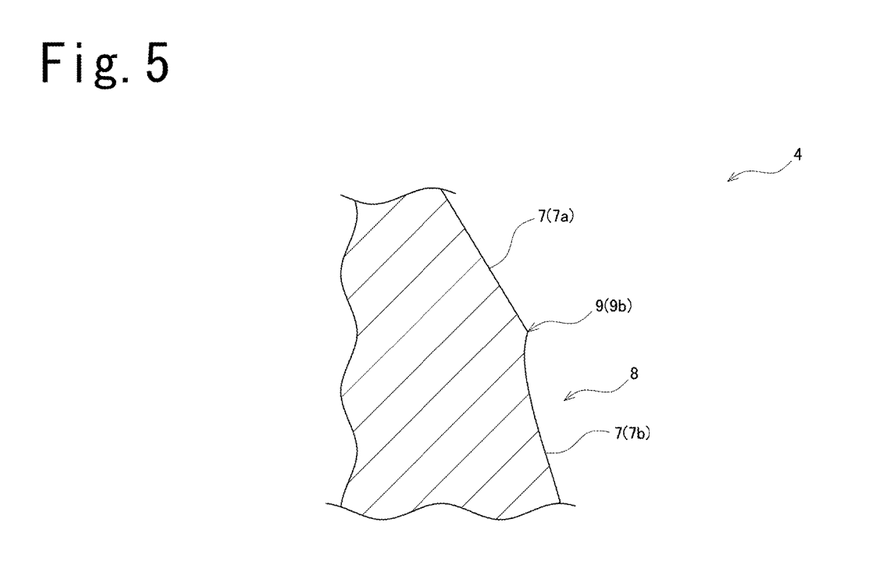
FIG. 5 shows an enlarged cross sectional view of a substantial part which is cut along a diametrical direction of a pneumatic tire according to another embodiment.

In the tire 1 according to the embodiment mentioned above, the edge portion 9 is structured, as shown in FIG. 4, such as to protrude out of the wall main body 7. However, the tire is not limited to the structure mentioned above. For example, in the tire, the edge portion 9 may be structured, as shown in FIG. 5, such as to be constructed by a line of intersection (a ridge line) of both surfaces 7a and 7b of the wall main body 7. In other words, with the structure where the edge portion 9 protrudes out of the wall main body 7, or the wall main body 7 itself is configured to protrude, the edge portion 9 delimits the area of the ornament portion 8. In FIGS. 4 and 5, the linear projection 10 and the protruding portion 11 are not shown.

Further, in the tire 1 according to the embodiment mentioned above, the ornament portion 8 is structured such as to be arranged continuously over a whole periphery in the tire peripheral direction in the side wall portion 4. However, the tire is not limited to the structure mentioned above. For example, in the tire, the ornament portion 8 may be structured, as shown in FIG. 6, such as to be arranged intermittently in the tire peripheral direction in the side wall portion 4.

Figure 6:
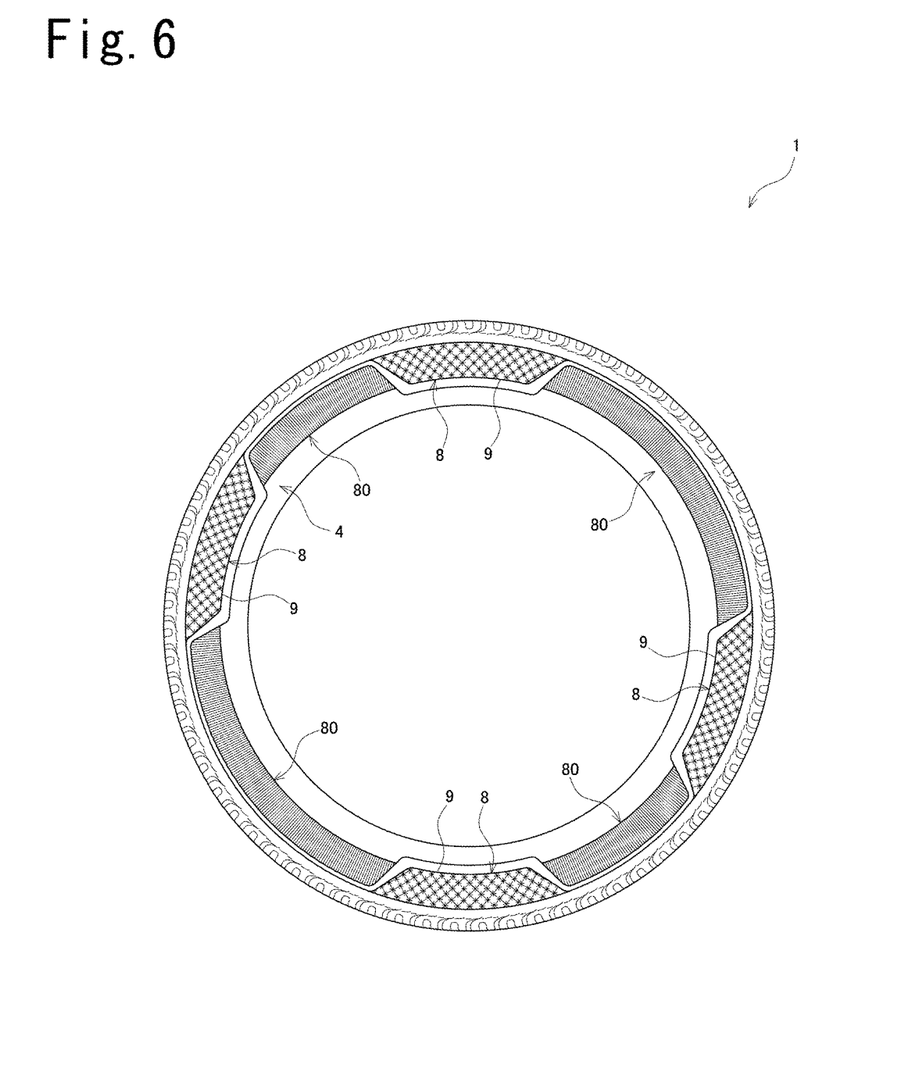
FIG. 6 shows a side elevational view of a whole of a pneumatic tire according to still another embodiment.

A side wall portion 4 according to FIG. 6 is provided with a conventional ornament portion (refer to FIG. 16) 80 which is constructed only by the linear projection 10, between the ornament portions 8 and 8. However, the side wall portion 4 may be provided with the ornament portion (for example, refer to FIG. 3 and FIGS. 7 to 15) 8 according to the present invention, in place of the conventional ornament portion 80. In other words, the ornament portion 8 according to the present invention may be arranged on at least a part of the side wall portion 4, in the tire.

Figure 7:
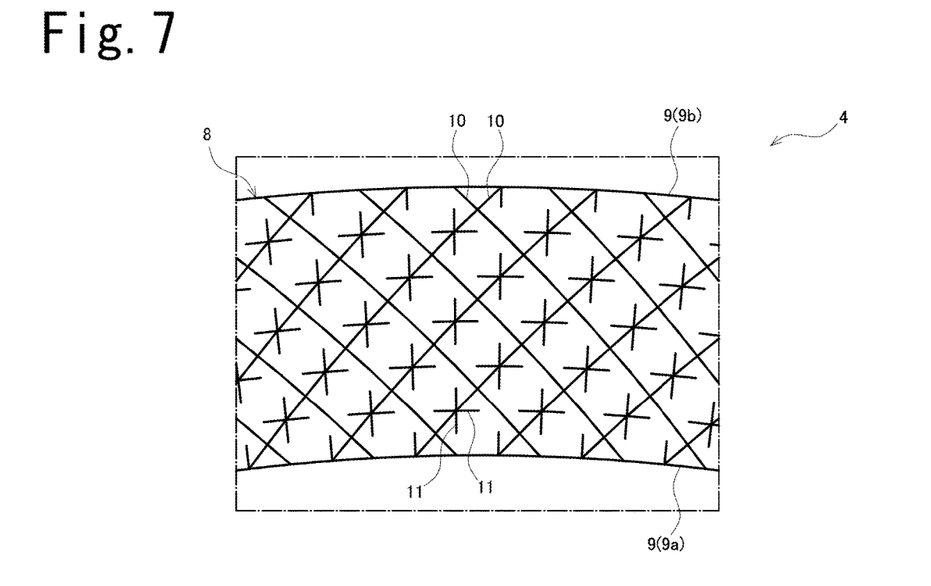
FIG. 7 shows a side elevational view of a substantial part of a pneumatic tire according to yet another embodiment.
Figure 8:
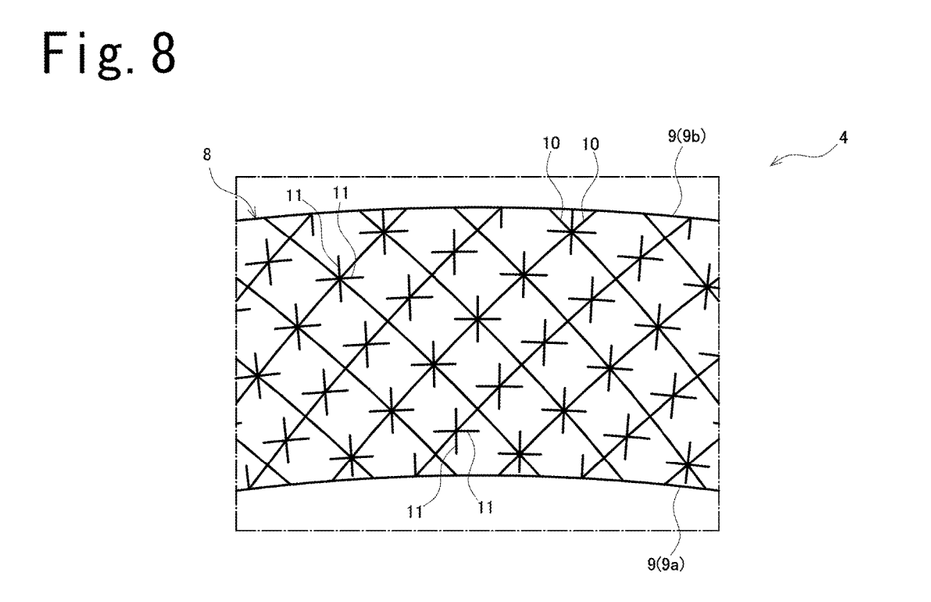
FIG. 8 shows a side elevational view of a substantial part of a pneumatic tire according to yet another embodiment.

Further, in the tire 1 according to the embodiment mentioned above, the protruding portion 11 is structured such as to be arranged so as to intersect with two linear projections 10 and 10. However, the tire is not limited to the structure mentioned above. For example, in the tire, the protruding portion 11 may be structured, as shown in FIG. 7, such as to be arranged so as to intersect with one linear projection 10, or the protruding portion 11 may be structured, as shown in FIG. 8, such as to be arranged so as to intersect with one linear projection 10 or two linear projections 10 and 10.

Further, in the tire 1 according to the embodiment mentioned above, the linear projection 10 is structured such as to be arranged so as to be inclined in relation to the tire peripheral direction and the tire diametrical direction. However, the tire is not limited to the structure mentioned above. For example, in the tire, the linear projection 10 may be structured, as shown in FIGS. 9 to 11, such as to be arranged along the tire peripheral direction or the tire diametrical direction.

Figure 9:
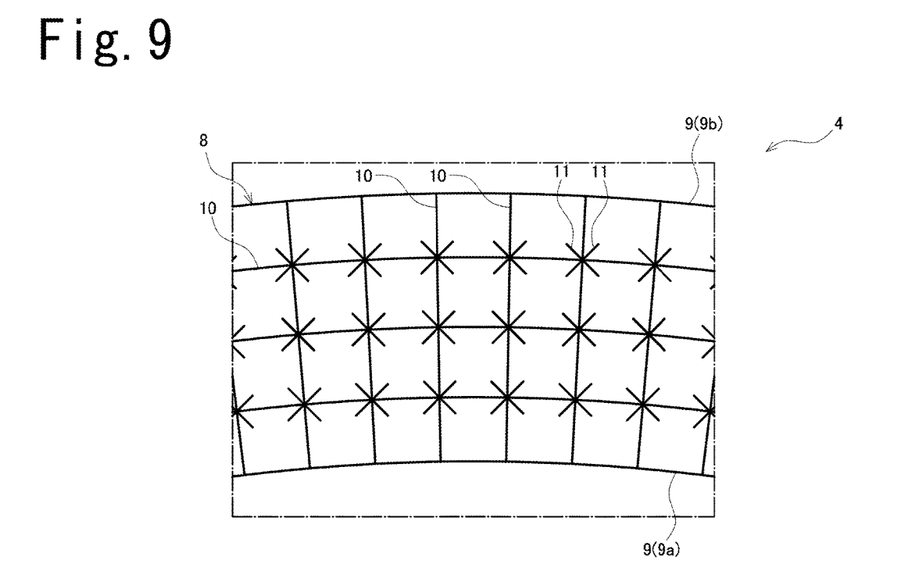
FIG. 9 shows a side elevational view of a substantial part of a pneumatic tire according to yet another embodiment.
Figure 10:
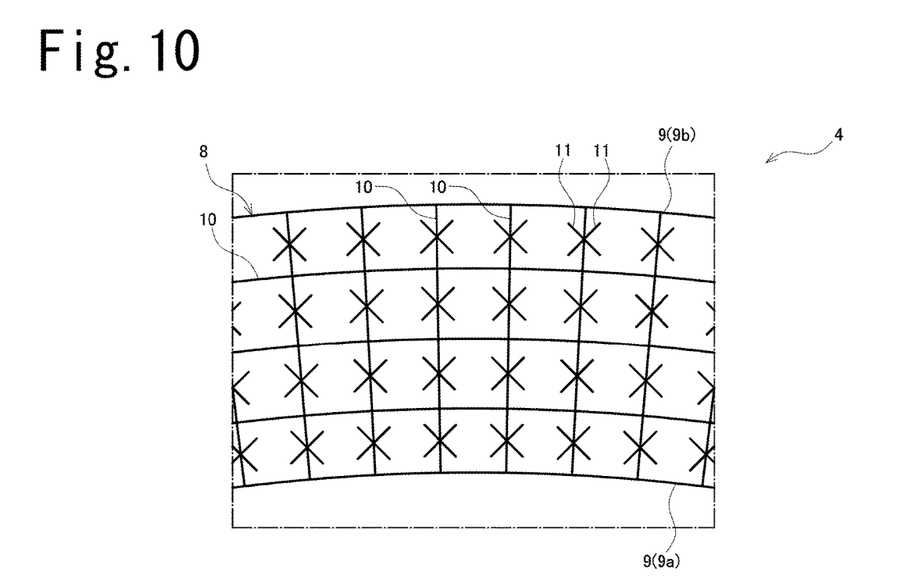
FIG. 10 shows a side elevational view of a substantial part of a pneumatic tire according to yet another embodiment.
Figure 11:
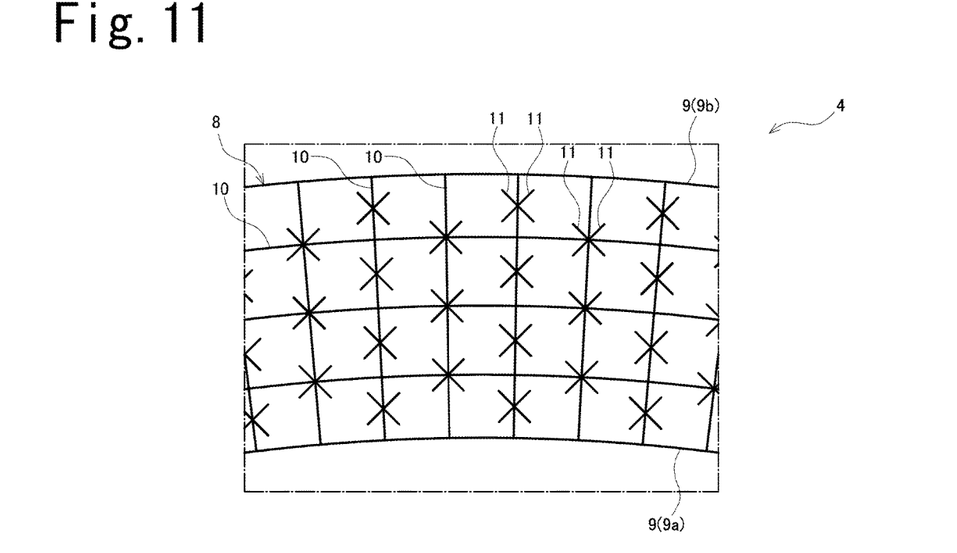
FIG. 11 shows a side elevational view of a substantial part of a pneumatic tire according to yet another embodiment.

In the side wall portion 4 according to FIGS. 9 to 11, the linear projection 10 is arranged so as to intersect with the other linear projection 10. Further, a plurality of linear projections 10 are arranged in the grid-like pattern. Further, in the side wall portion 4 according to FIG. 9, the protruding portion 11 is arranged so as to intersect with two linear projections 10 and 10. In the side wall portion 4 according to FIG. 10, the protruding portion 11 is arranged so as to intersect with one linear projection 10. Further, in the side wall portion 4 according to FIG. 11, the protruding portion 11 is arranged so as to intersect with one linear projection 10 or two linear projections 10 and 10.

Figure 12:
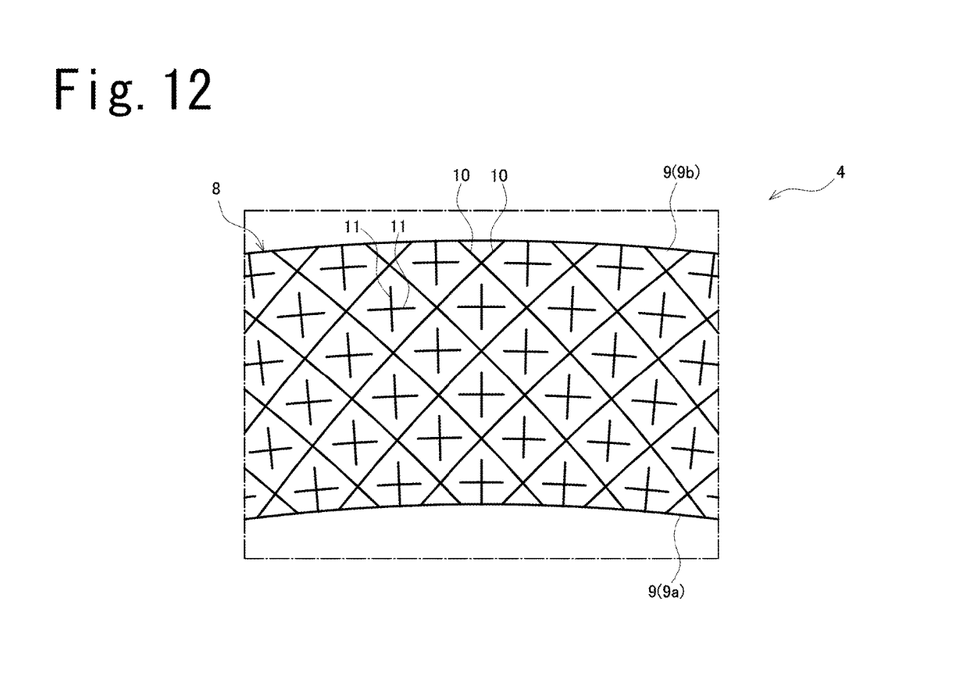
FIG. 12 shows a side elevational view of a substantial part of a pneumatic tire according to yet another embodiment.
Figure 13:
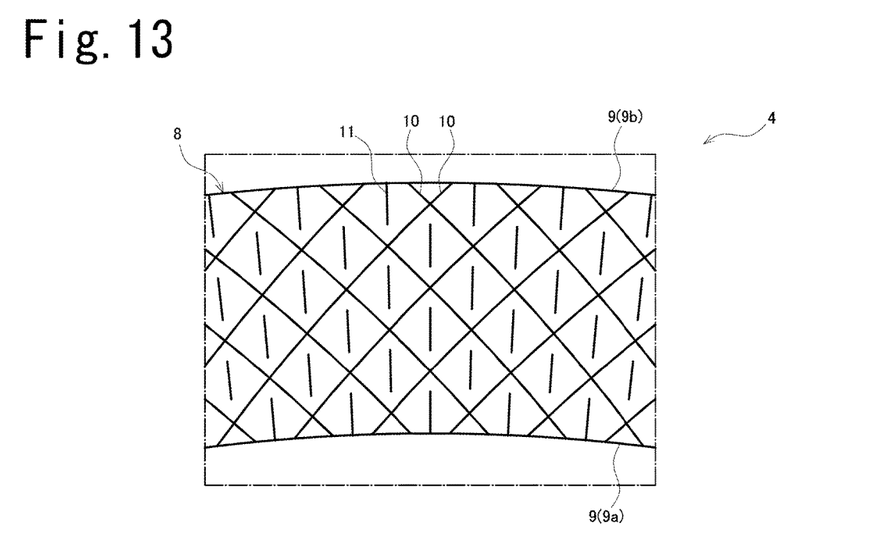
FIG. 13 shows a side elevational view of a substantial part of a pneumatic tire according to yet another embodiment.

Further, in the tire 1 according to the embodiment mentioned above, the protruding portion 11 is structured such as to be arranged so as to intersect with the linear projection 10. However, the tire is not limited to the structure mentioned above. For example, in the tire, the protruding portion 11 may be structured, as shown in FIGS. 12 and 13, such as to be arranged so as to be separated from the linear projection 10.

Figure 14:
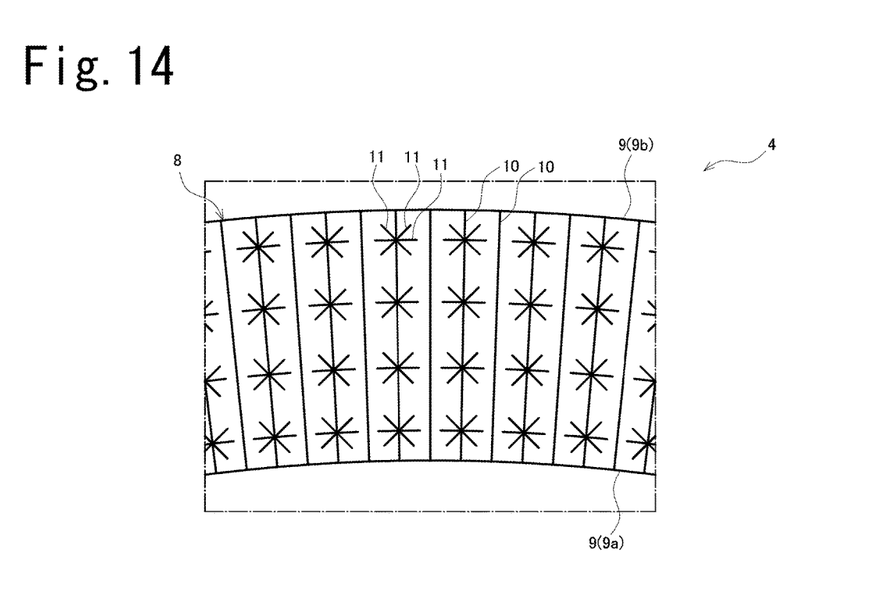
FIG. 14 shows a side elevational view of a substantial part of a pneumatic tire according to yet another embodiment.

Further, in the tire 1 according to the embodiment mentioned above, the protruding portion 11 is structured such as to be arranged so as to intersect with one other protruding portion 11. However, the tire is not limited to the structure mentioned above. For example, in the tire, the protruding portion 11 may be structured, as shown in FIG. 13, such as to be arranged so as to be separated from the other protruding portion 11. Further, the protruding portion 11 may be structured, as shown in FIG. 14, such as to be arranged so as to intersect with two or more other protruding portions 11 and 11.

Figure 15:
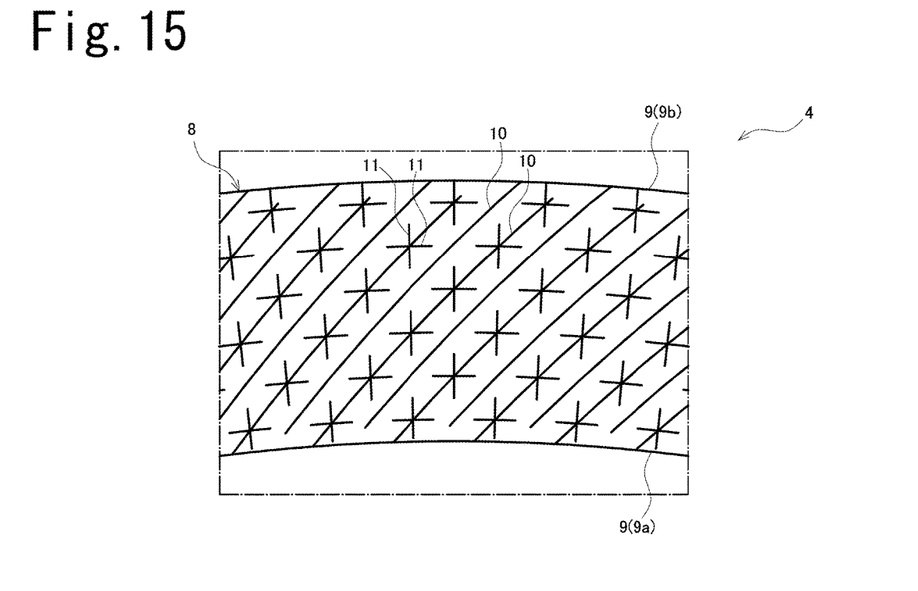
FIG. 15 shows a side elevational view of a substantial part of a pneumatic tire according to yet another embodiment.

Further, in the tire 1 according to the embodiment mentioned above, the linear projection 10 is structured such as to be arranged so as to intersect with the other linear projection 10. However, the tire is not limited to the structure mentioned above. For example, in the tire, the linear projection 10 may be structured, as shown in FIGS. 14 and 15, such as to be arranged so as to be spaced from the other linear projection 10.

Further, in the tire 1 according to the embodiment mentioned above, each of the end portions of the linear projection 10 is structured such as to be connected to the edge portion 9. However, the tire is not limited to the structure mentioned above. For example, in the tire, at least one end portion of the linear projection 10 may be structured, as shown in FIG. 15, such as to be arranged so as to be spaced from the edge portion 9. In other words, the linear projection 10 is formed linearly over the edge portion 9 from the edge portion 9.

Further, in the tire 1 according to the embodiment, the linear projection 10 and the protruding portion 11 are structured such as to be formed linearly. However, the tire is not limited to the structure mentioned above. For example, in the tire, at least one of the linear projection 10 and the protruding portion 11 may be structured such as to be formed into a curved shape.

Further, in the tire 1 according to the embodiment mentioned above, the protruding amount of the protruding portion 11 is structured such as to be the same as the protruding amount of the linear projection 10. However, the tire is not limited to the structure mentioned above. For example, in the tire, the protruding amount of the protruding portion 11 may be structured such as to be larger or smaller than the protruding amount of the linear projection 10.

In the meantime, in order to effectively inhibit the outer surface of the side wall portion 4 from being soiled, the protruding amount of the protruding portion 11 is preferably the same as the protruding amount of the linear projection 10 or larger than the protruding amount of the linear projection 10. If the protruding amount of the protruding portion 11 is too large, an aesthetic property of the side wall portion 4 is lowered. Therefore, the protruding amount of the protruding portion 11 is preferably between 100% and 150% of the protruding amount of the linear projection 10.

EXAMPLES

Figure 19:
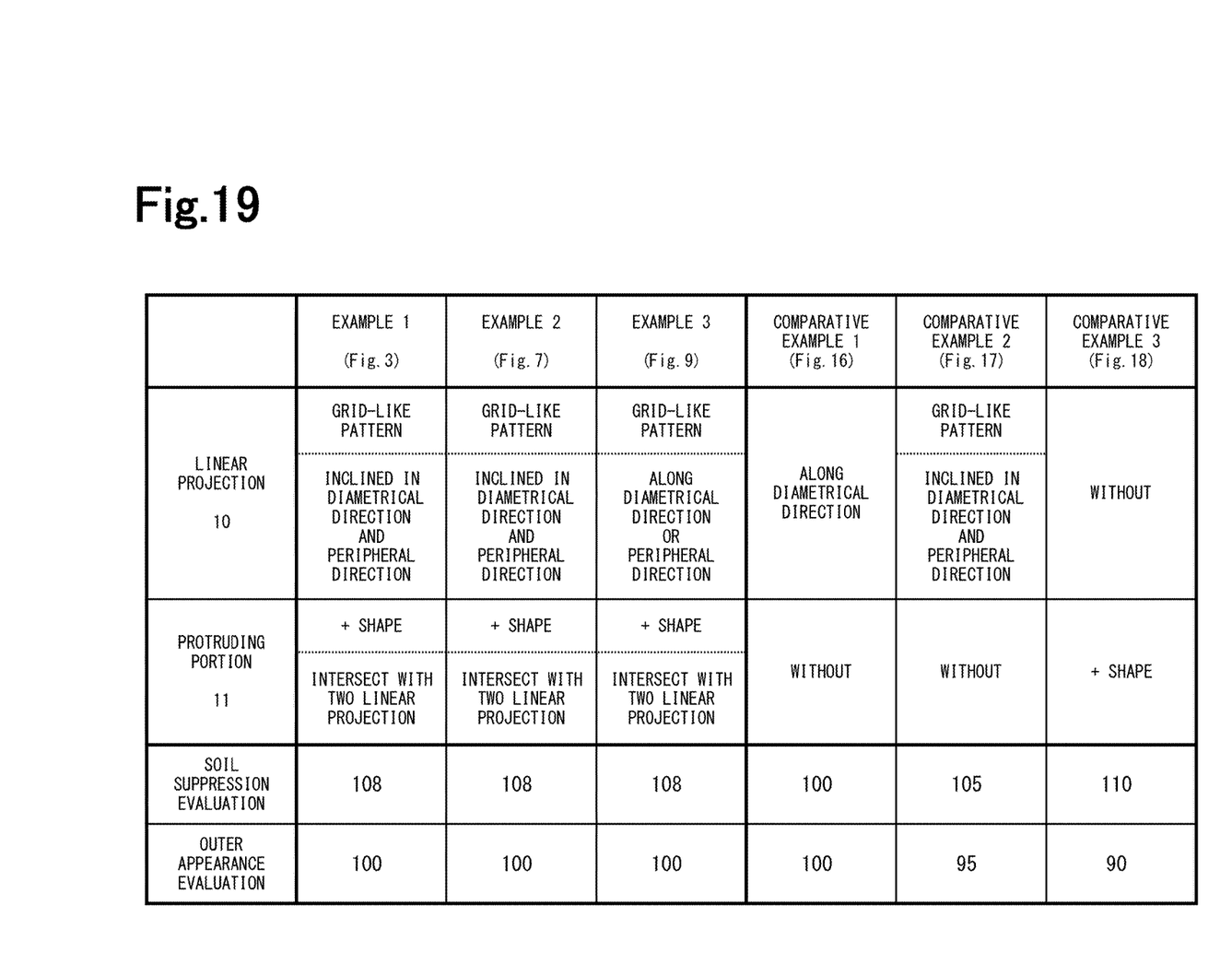
FIG. 19 shows a table of evaluation between examples and comparative examples.

In order to specifically show the structure and the effect of the present invention, a description will be given below of examples of the pneumatic tire and comparative examples thereof with reference to FIG. 19.
<Soil Suppression Evaluation>
Each of tires having a size of 195/65R15 was assembled in a rim of 15×6J, was installed to a domestic FF vehicle after being filled with air so that an internal pressure reaches 230 kPa, and was thereafter traveled on a muddy terrain course. Further, soil suppression was evaluated according to a feeling evaluation on the basis of a visual check by five testers after traveling. The evaluation was made on the basis of an index number which is obtained by setting a result of a comparative example 1 to 100. The greater index number indicates the more suppression of the soil in the side wall portion, and excellence in the soil suppression evaluation.
<Outer Appearance Evaluation>
Each of tires having a size of 195/65R15 was assembled in a rim of 15×6J, was thereafter filled with air so that the internal pressure reaches 230 kPa. Further, an outer appearance was evaluated according to the feeling evaluation on the basis of the visual check by five testers in fine outdoors. The evaluation was made by an index number which is obtained by setting a result of the comparative example 1 to 100. The greater index number indicates the less noticeable of the recesses and protrusions generated on the outer surface of the side wall portion at the tire molding time, and excellence in the outer appearance.

Examples 1 to 3

Figure 2:
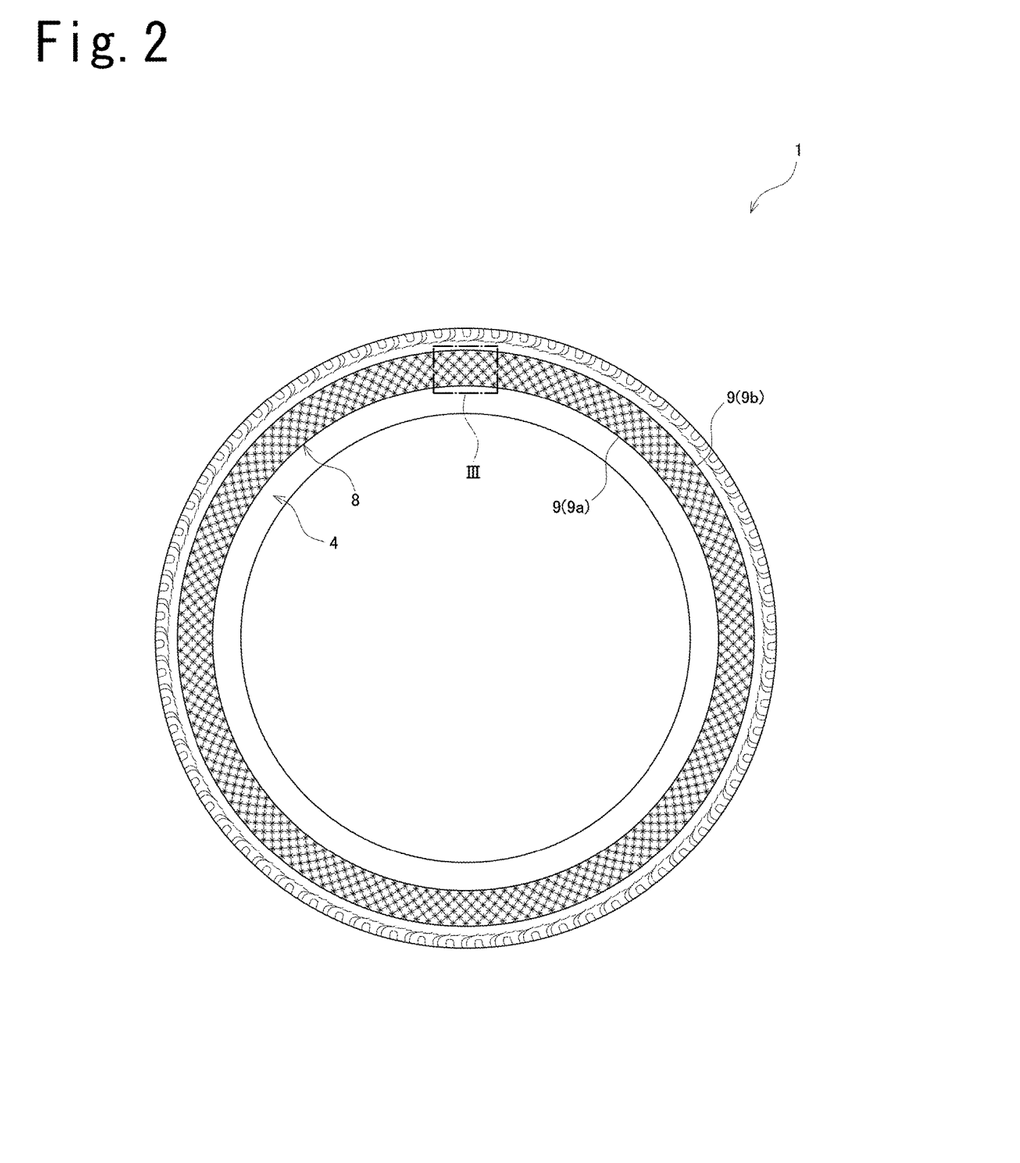
FIG. 2 shows a side elevational view of a whole of the pneumatic tire according to the embodiment.
Figure 3:
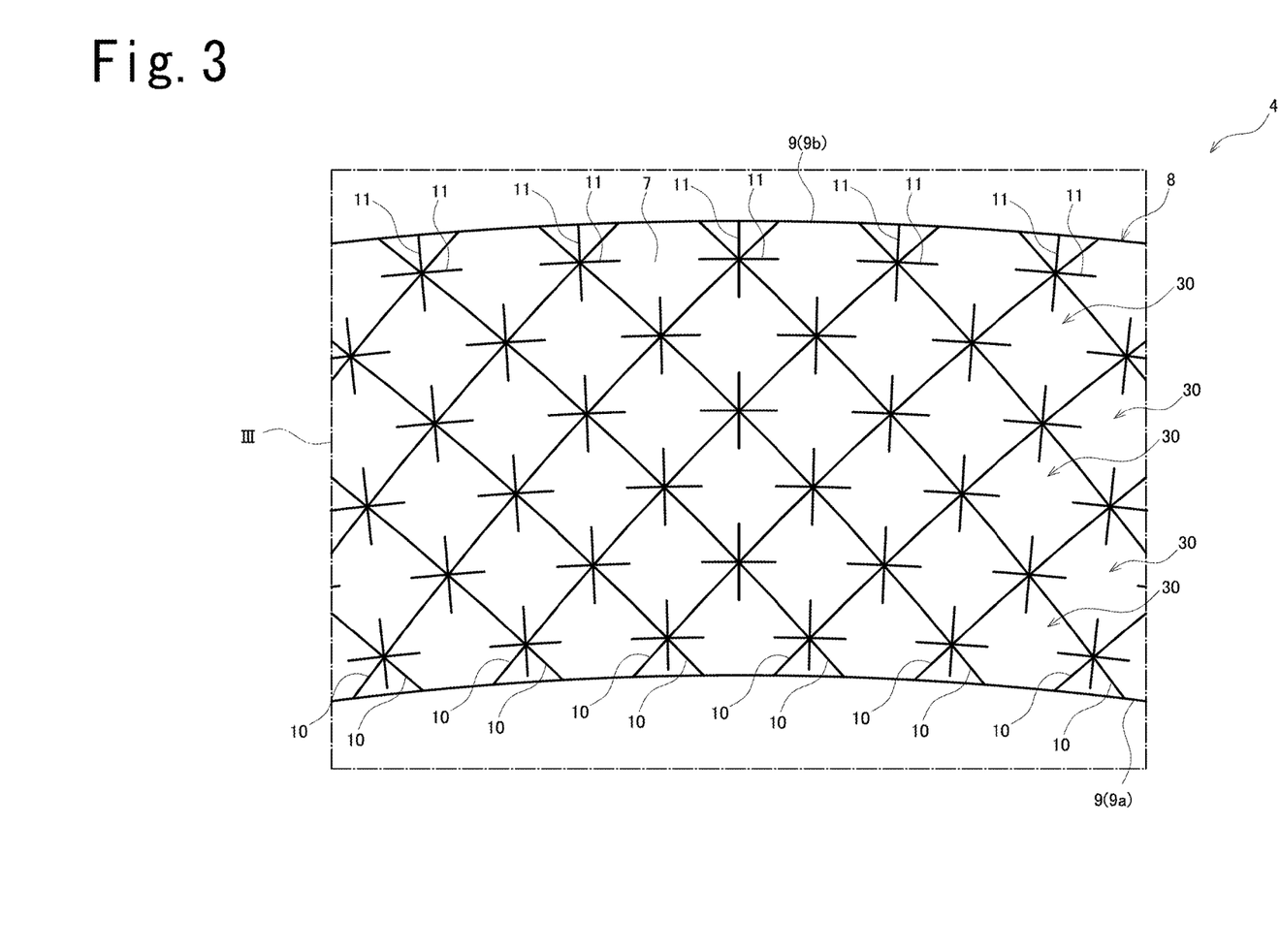
FIG. 3 shows an enlarged view of an area III in FIG. 2 of the pneumatic tire according to the embodiment.

An example 1 is a tire according to the embodiment shown in FIGS. 1 to 3.
An example 2 is a tire shown in FIG. 7. Specifically, a plurality of linear projections 10 are respectively arranged so as to be inclined in the tire diametrical direction and the tire peripheral direction and are arranged in a grid-like pattern. Further, the protruding portion 11 is arranged so as to intersect with one other protruding portion 11 (formed into+shape), and is arranged so as to intersect with two linear projections 10 and 10.
An example 3 is a tire shown in FIG. 9. Specifically, a plurality of linear projections 10 are respectively arranged along the tire diametrical direction or the tire peripheral direction and are arranged in a grid-like pattern. Further, the protruding portion 11 is arranged so as to intersect with one other protruding portion 11 (formed into+shape), and is arranged so as to intersect with two linear projections 10 and 10.
A width of the linear projections 10 according to the examples 1 to 3 is 0.6 mm, a rectangular side of the grid-like pattern (a spaced distance between the linear projections 10 and 10) is 10 mm, and a protruding amount of the linear projection 10 is 0.3 mm. Further, a width of the protruding portions 11 according to the examples 1 to 3 is 0.6 mm, a length at which the protruding portion 11 extends from the linear projection 10 is 2.5 mm (25% of the rectangular side of the grid-like pattern), and a protruding amount of the protruding portion 11 is 0.3 mm (100% of the protruding amount of the linear projection 10).

Comparative Examples 1 to 3

Figure 16:
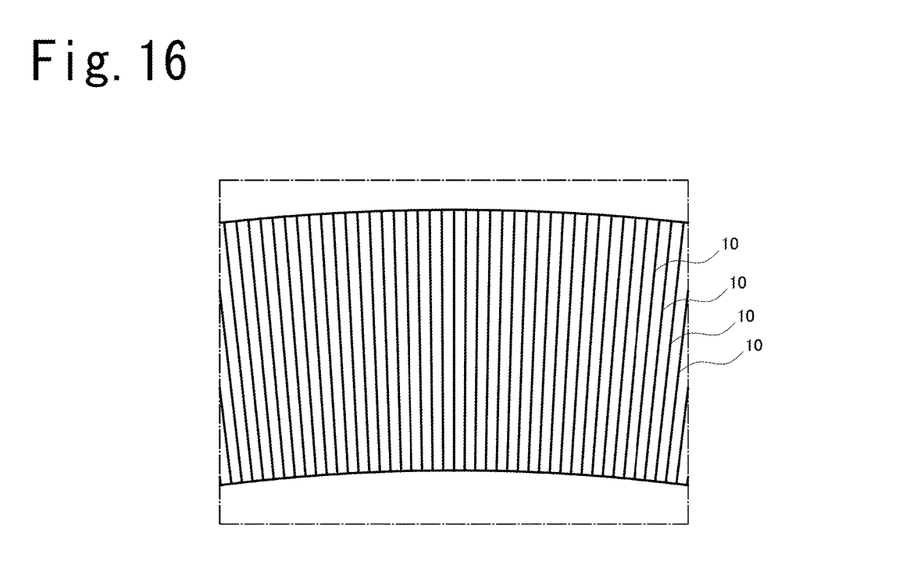
FIG. 16 shows a side elevational view of a substantial part of a pneumatic tire according to a comparative example.
Figure 17:
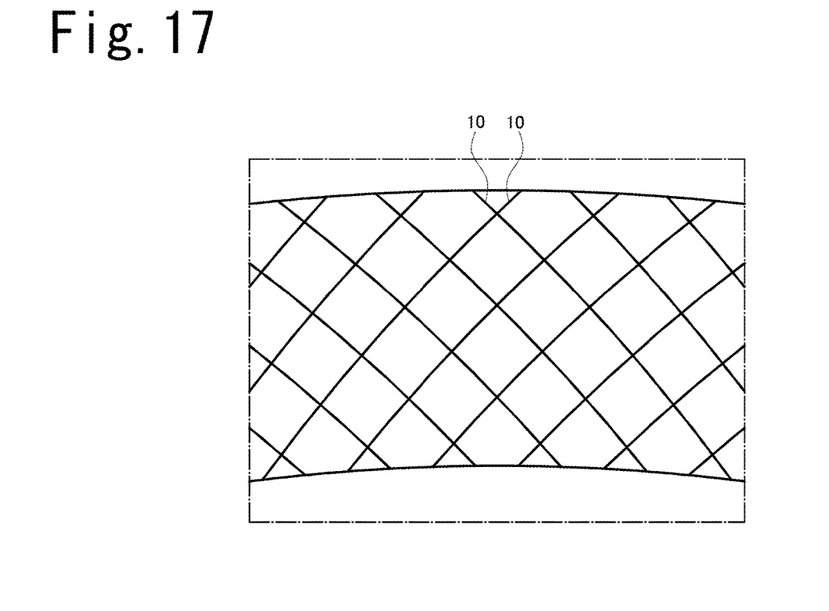
FIG. 17 shows a side elevational view of a substantial part of a pneumatic tire according to a comparative example.
Figure 18:
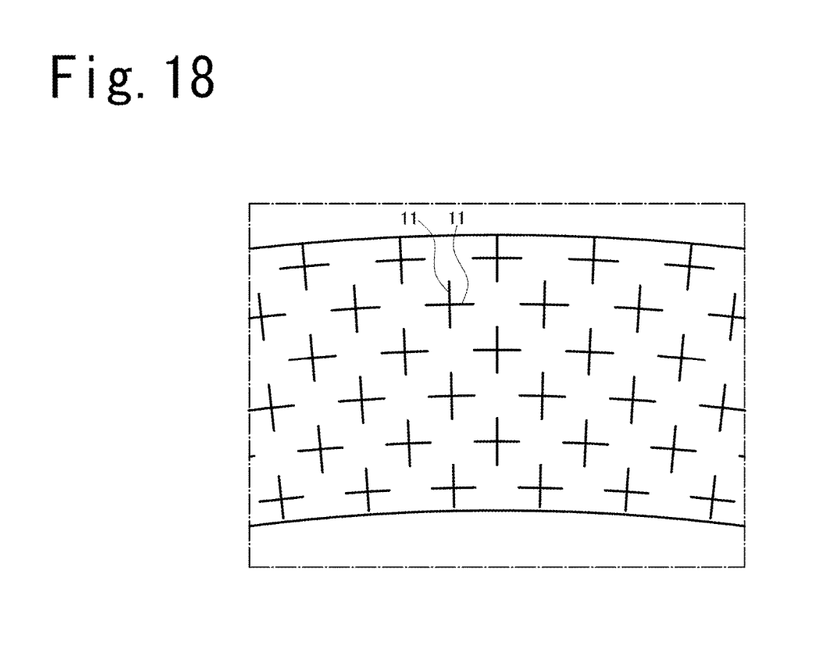
FIG. 18 shows a side elevational view of a substantial part of a pneumatic tire according to a comparative example.

A comparative example 1 is a tire shown in FIG. 16. Specifically, a plurality of linear projections 10 are respectively arranged along the tire diametrical direction; however, the protruding portion 11 is not provided. Further, a width of the linear projection 10 according to the comparative example 1 is 0.6 mm, a spaced distance between the linear projections 10 and 10 is 1 mm, and a protruding amount of the linear projection 10 is 0.3 mm.
A comparative example 2 is a tire shown in FIG. 17. Specifically, a plurality of linear projections 10 are respectively arranged so as to be inclined in the tire diametrical direction and the tire peripheral direction and are arranged in a grid-like pattern; however, the protruding portion 11 is not provided. A width of the linear projection 10 according to the comparative example 2 is 0.6 mm, a rectangular side of the grid-like pattern (a spaced distance between the linear projections 10 and 10) is 10 mm, and a protruding amount of the linear projection 10 is 0.3 mm.
A comparative example 3 is a tire shown in FIG. 18. Specifically, a protruding portion 11 is arranged so as to intersect with one other protruding portion 11 (formed into+shape); however, the linear projection 10 is not provided. A width of the protruding portion 11 according to the comparative example 3 is 0.6 mm, a length of the protruding portion 11 is 7 mm, and a protruding amount of the protruding portion 11 is 0.3 mm.
<Results of Evaluation>
In the comparative example 1, the soil suppression evaluation cannot be improved. Further, in the comparative examples 2 and 3, the soil suppression evaluation can be improved; however, the outer appearance evaluation is lowered. On the contrary, in the examples 1 to 3, the soil suppression evaluation can be improved, and the outer appearance evaluation can be further maintained.

What is claimed is:
1. A pneumatic tire comprising:
a plurality of linear projections which are formed linearly from an inner peripheral edge portion to an outer peripheral edge portion, in at least a partial area on an outer surface of a side wall portion; and
a plurality of protruding portions which are formed linearly in the at least partial area,
wherein the respective protruding portion is arranged so that at least a part of the respective protruding portion is positioned between at least two of the plurality of linear projections, and the respective protruding portion intersects with two of the plurality of linear projections and another respective protruding portion at only one point, and
wherein at least one end of each protruding portion does not come in contact with any linear projection and does not come in contact with any other protruding portion.
2. A pneumatic tire comprising:
a plurality of linear projections which are formed linearly from an inner peripheral edge portion to an outer peripheral edge portion, in at least a partial area on an outer surface of a side wall portion; and
a plurality of protruding portions which are formed linearly in the at least partial area,
wherein the respective protruding portion is arranged so that at least a part of the protruding portion is positioned between at least two of the plurality of linear projections, and the respective protruding portion intersects with at least one of the plurality of linear projections and/or another respective protruding portion at only one point,
wherein the plurality of linear projections are arranged in a grid pattern, and
wherein at least one end of each protruding portion does not come in contact with any linear projection and does not come in contact with any other protruding portion.

3. The pneumatic tire according to claim 2, wherein the protruding portion is arranged so as to intersect with the linear projection.

4. The pneumatic tire according to claim 1, wherein a protruding amount of the respective protruding portion is the same as a protruding amount of the respective linear projection, or larger than the protruding amount of the respective linear projection.

5. The pneumatic tire according to claim 3, wherein a protruding amount of the respective protruding portion is the same as a protruding amount of the respective linear projection, or larger than the protruding amount of the respective linear projection.

6. The pneumatic tire according to claim 3, wherein a length that the protruding portion extends from the linear projection is between 10% and 45% of a rectangular side of the grid pattern.

7. The pneumatic tire according to claim 3, wherein a rectangular side of the grid pattern is between 3 mm and 15 mm, and a length that the protruding portion extends from the linear projection is between 0.3 mm and 6.75 mm.

8. The pneumatic tire according to claim 1, wherein the plurality of linear projections are arranged in a grid pattern.

9. The pneumatic tire according to claim 8, wherein a length that the protruding portion extends from the linear projection is between 10% and 45% of a rectangular side of the grid pattern.

10. The pneumatic tire according to claim 8, wherein a rectangular side of the grid pattern is between 3 mm and 15 mm, and a length that the protruding portion extends from the linear projection is between 0.3 mm and 6.75 mm.

11. The pneumatic tire according to claim 1, wherein both ends of at least one protruding portion do not come in contact with any linear projection and do not come in contact with any other protruding portion.

12. The pneumatic tire according to claim 3, wherein both ends of at least one protruding portion do not come in contact with any linear projection and do not come in contact with any other protruding portion.

13. A pneumatic tire comprising:
a plurality of linear projections which are formed linearly from an inner peripheral edge portion to an outer peripheral edge portion, in at least a partial area on an outer surface of a side wall portion; and
a plurality of protruding portions which are formed linearly in the at least partial area,
wherein the respective protruding portion is arranged so that at least a part of the protruding portion is positioned between at least two of the plurality of linear projections, and the respective protruding portion does not intersect with a linear projection or another respective protruding portion,
wherein the plurality of linear projections are arranged in a grid pattern, and
the plurality of protruding portions are disposed inside of the grid pattern.

14. The pneumatic tire according to claim 13, wherein a protruding amount of the respective protruding portion is the same as a protruding amount of the respective linear projection, or larger than the protruding amount of the respective linear projection.

15. The pneumatic tire according to claim 13, wherein a length that the protruding portion extends from the linear projection is between 10% and 45% of a rectangular side of the grid pattern.

16. The pneumatic tire according to claim 13, wherein a rectangular side of the grid pattern is between 3 mm and 15 mm, and a length that the protruding portion extends from the linear projection is between 0.3 mm and 6.75 mm.

* * * * *